United States Patent [19]

Pitoiset

[11] Patent Number: 4,559,026
[45] Date of Patent: Dec. 17, 1985

[54] SPEED VARIATION PULLEY

[75] Inventor: Didier Pitoiset, Montmorency, France

[73] Assignee: Valeo, Paris, France

[21] Appl. No.: 442,243

[22] Filed: Nov. 17, 1982

[30] Foreign Application Priority Data

Nov. 18, 1981 [FR] France .................. 81 21590

[51] Int. Cl.[4] .............................. F16H 11/06
[52] U.S. Cl. ......................... 474/14; 474/8; 474/46
[58] Field of Search ............ 474/14, 13, 17, 94, 474/8, 46; 137/53; 73/535, 546

[56] References Cited

U.S. PATENT DOCUMENTS

| 1,583,640 | 5/1926 | Zitzerman | 73/535 |
| 3,060,759 | 10/1962 | Van Des Brugghen | 474/46 |
| 3,174,348 | 3/1965 | Luenberger | 343/12 MD |
| 4,132,120 | 1/1979 | Fénart | 474/14 |
| 4,178,808 | 12/1979 | Bacher | 474/13 |
| 4,365,963 | 12/1982 | de Briel | 474/13 |

FOREIGN PATENT DOCUMENTS

| 1028894 | 4/1958 | Fed. Rep. of Germany . |
| 1154679 | 9/1963 | Fed. Rep. of Germany .......... 474/8 |
| 1197715 | 7/1965 | Fed. Rep. of Germany . |
| 2716781 | 10/1977 | Fed. Rep. of Germany ........ 474/13 |
| 1132617 | 3/1957 | France . |
| 1167808 | 12/1958 | France . |
| 2430551 | 2/1980 | France . |
| 2434316 | 3/1980 | France . |
| 2459921 | 1/1981 | France . |

Primary Examiner—James A. Leppink
Assistant Examiner—M. Goodwin
Attorney, Agent, or Firm—Charles E. Brown; Charles A. Brown

[57] ABSTRACT

A speed variator pulley comprises a pair of annular plates mounted on a hub. One of the plates is axially movable relative to the other by means of a diaphragm which, by its peripheral portion forming a dished plate spring, axially bears to rock against the said movable plate. Axially interposed between the diaphragm and the movable plate in order to form a rocking axial support, is a spacer of elastic material, which on the one hand is fastened both axially and circumferentially to the diaphragm and which on the other hand is fastened at least axially to the movable plate.

23 Claims, 31 Drawing Figures

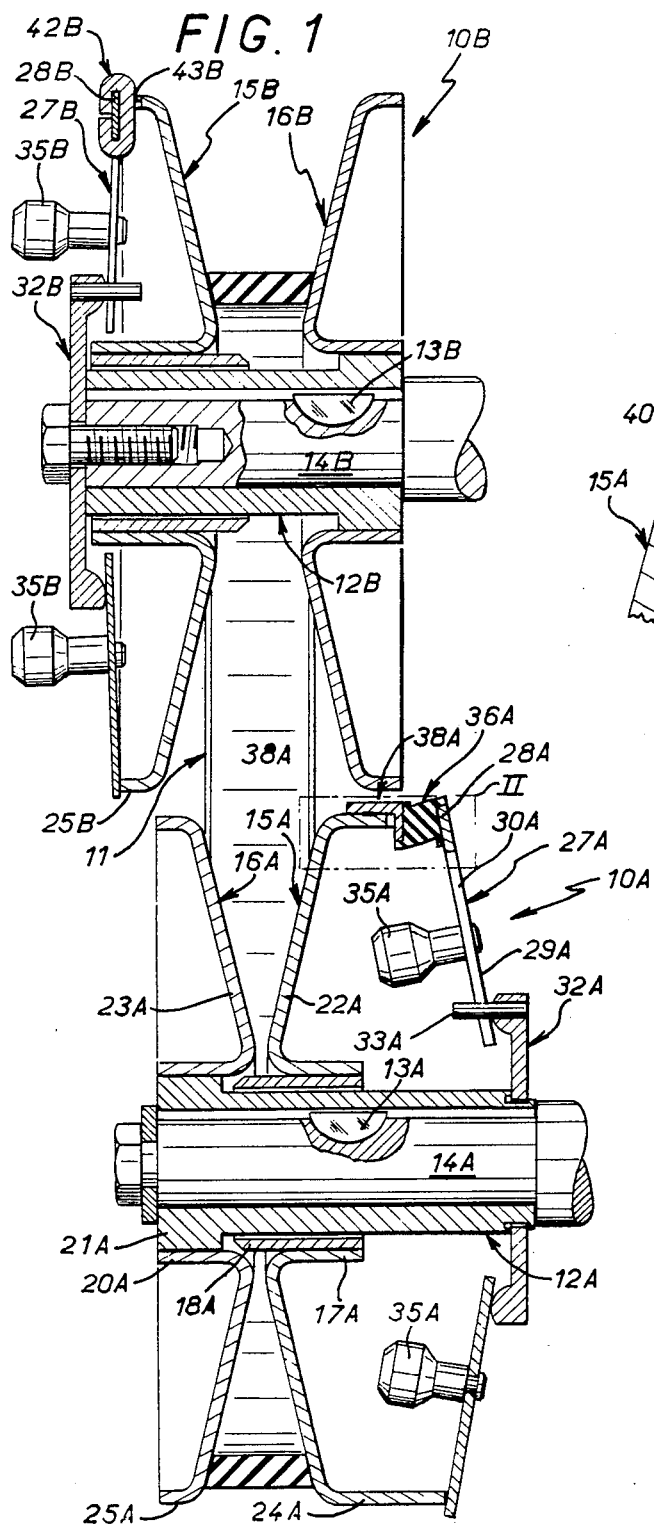
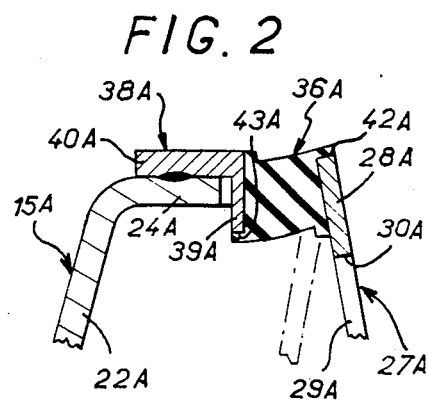

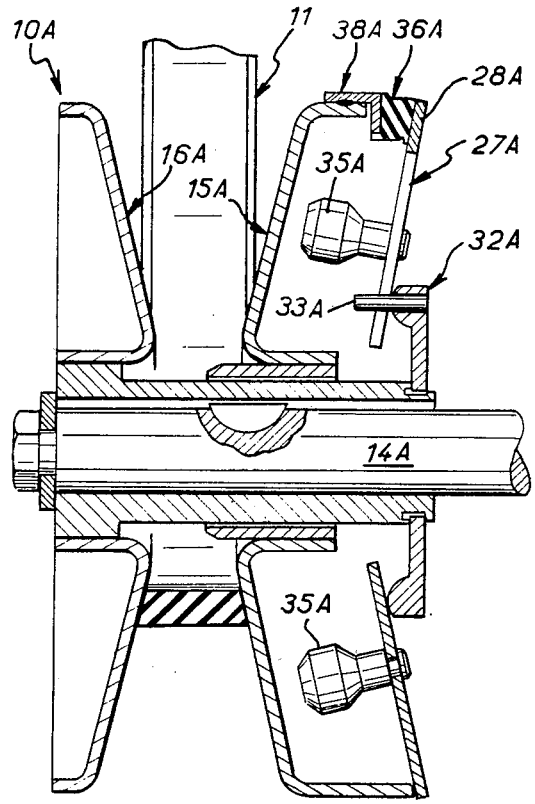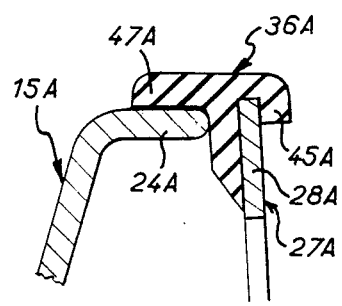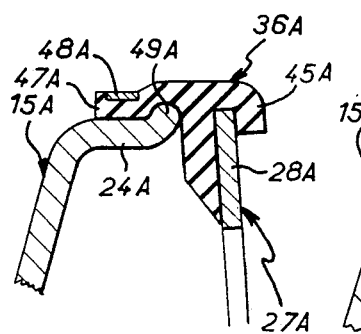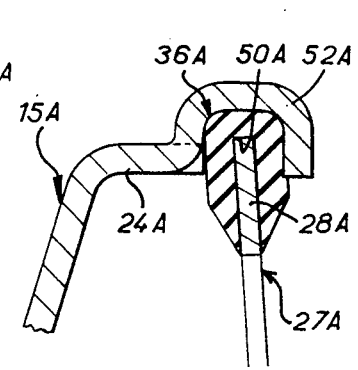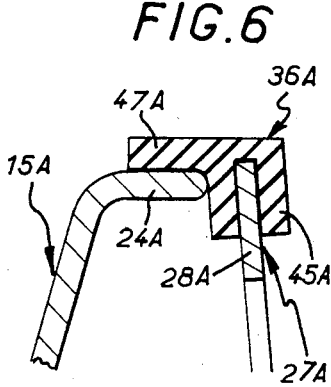

SPEED VARIATION PULLEY

BACKGROUND OF THE INVENTION

The present invention relates generally to speed variations suitable for use in the controlled driving of any device with the aid of any motor, such as for example in a motor vehicle for driving, with the aid of the engine of the vehicle, an accessory such as an alternator, water pump, compressor or fan.

The invention relates more particularly to speed variators which consist of two pulleys, one being the driving pulley and the other the driven pulley, and of a belt passing in the form of an endless loop over the two pulleys, each of the pulleys comprising a hub and, disposed facing one another and around the hub, two annular plates at least one of which—here for the sake of convenience referred to as the movable plate—is mounted for axial movement relative to the hub under the control of resilient return means consisting of an annular member, referred to as the diaphragm, which comprises on the one hand a peripheral portion forming a dished plate spring and on the other hand a central portion divided by slots into radial fingers.

A speed variator of this kind is described in U.S. Pat. No. 4,132,120 filed on the Mar. 31, 1977 and issued on the Jan. 2, 1979.

As described in this U.S. patent, the diaphragm of each of the pulleys bears axially, by its peripheral portion forming a dished plate spring, against the movable plate associated with it, while by its central portion divided by slots into radial fingers, it bears axially against a member, referred to as the support member, axially fastened to the corresponding hub.

Both the axial support of the diaphragm against the movable plate and the axial support of the diaphragm against the support member take the form of axial rocking actions.

During operation, the movable plate is displaced between two end positions—namely an advanced and a retracted position—relative to the other plate, which here for the sake of convenience will be called the fixed plate, and in one of these positions the diaphragm has a first generally frustoconical configuration, while in the other position it has a second generally frustoconical configuration which is the inverse of the first configuration.

From one of these frustoconical configurations to the other the diaphragm therefore acts like a hinge, both in contact with the movable plate and in contact with the support member.

The rocking axial support thus achieved between the diaphragm and the movable plate is inevitably a source of not inconsiderable wear on the part of one and/or the other of these members, and this is aggravated by the fact that in practice these members are made of metal.

This rocking axial support may also be the cause of scratching and/or peeling of the surface of the diaphragm, to the detriment of its working life, particularly when the diaphragm has been shot-blasted.

In addition, it is necessary to ensure suitable centring of the diaphragm relative to the movable plate against which it bears, failing which during the rotation of the unit, in the course of operation, the diaphragm would be subject to a relative reciprocating movement in relation to the respective plate, which would inevitably lead to additional wear apart from that already due to the rocking nature of the support, as indicated above.

In addition to the fact that such accumulated wear will unavoidably result in a reduction of the resilient loading of the movable plate applied axially by the diaphragm, this wear is also detrimental to the life of the diaphragm and may even give rise to rupturing of the diaphragm.

In order to achieve the desirable centring of the diaphragm relative to the movable plate against which it bears, it is proposed in the abovementioned U.S. Pat. No. 4,132,120 to attach to the diaphragm, in the peripheral portion of the latter which forms a dished spring plate, a certain number of engagement blocks by which it is in engagement with the movable plate, for which purpose cutouts complementary to the engagement blocks are provided on the latter.

Although from the point of view of the desired centring an arrangement of this kind has given and still does give satisfaction, and despite the fact that in addition such an arrangement advantageously makes it possible, with the aid of the same engagement blocks, to achieve rotational connection of the movable plate to the diaphragm, and through the latter and the support member to the corresponding hub, it has the disadvantage of not eliminating the unavoidable occurrence of wear between the diaphragm and the movable plate, because of the rocking axial support between them.

Furthermore, through the punctiform presence of engagement blocks at the various points on the peripheral portion of the diaphragm which forms a dished plate spring, this arrangement gives rise to discontinuous stressing in the diaphragm, since each of these engagement blocks inevitably gives rise to a concentration of stressing in its fastening zone, and such discontinuity of stressing is unavoidably detrimental to the operating conditions of the diaphragm and to its life.

Finally, in the case of a driving pulley, such an arrangement still makes it possible for the diaphragm to be turned inside out in the retracted position of the movable plate, so that it is necessary to make employ means preventing this from happening.

The present invention relates generally to an arrangement which enables these disadvantages to be avoided and which in addition leads to other advantages.

SUMMARY

More precisely, the invention relates to a speed variator pulley of the kind comprising a hub and, disposed facing one another and around the hub, two annular plates, of which at least one, here for the sake of convenience referred to as the movable plate, is mounted for axial movement relative to the hub under the control of resilient return means, the latter being composed of an annular member, referred to as the diaphragm, comprising on the one hand a peripheral portion forming a dished plate spring, which axially bears rockingly against the movable plate, and, on the other hand, a central portion divided by slots into radial fingers and axially bearing rockingly against a member axially fastened to the hub and called the support member, this speed variator pulley being characterised in that between the diaphragm and the movable plate there is axially interposed, in order to form a rocking axial support, a spacer of elastic material which, on the one hand, is fastened both axially and circumferentially to the peripheral portion of the diaphragm which forms a dished plate spring, and on the other hand is fastened at least axially to the movable plate.

Thus, because of this axial fastening of the spacer used, the elastic material of the spacer necessarily works in its mass during the rocking of the diaphragm.

It is true that U.S. Pat. No. 3,174,348 provides for the interposition of a spacer of elastic material between each of the plates of a speed variator pulley and a duplicate plate disposed parallel thereto.

However, a duplicate plate of this kind does not constitute a diaphragm in the sense of the present application, and in particular no axial rocking movement takes place between it and the plate with which it is associated.

Nothing in this U.S. Pat. No. 3,174,348 suggests that a spacer of elastic material could be suitable in the case of a rocking axial support.

On the contrary, for such a rocking axial support those skilled in the art would normally reject a priori the use of such a spacer of elastic material, since the latter would have to work there both in compression and in tension and thus under conditions likely to impair its life rapidly.

Experience shows, and tests confirm, that in reality a spacer of elastic material of this kind may surprisingly be suitable.

It may for example be adhesive bonded to the diaphragm.

However, according to the invention it is preferably more simply "joined by adhesion" to the diaphragm, that is to say vulcanised in situ on the latter at a temperature which otherwise will not affect the metallurgical properties of the diaphragm.

This results in an interesting simplification of manufacture.

At the same time, numerous embodiments can be adopted for fastening the spacer of elastic material, at least axially, to the movable plate.

Depending on convenience, it is in particular possible for this spacer of elastic material to be bonded or joined by adhesion to the movable plate or to an auxiliary part, here for convenience called a connecting member, which is to be axially joined to the movable plate.

However this may be, because of the use of the spacer of elastic material according to the invention the wear between the diaphragm and the movable plate is advantageously avoided at their support site, as well as scratching and/or peeling, and the peripheral portion of the diaphragm forming the dished plate spring no longer undergoes any discontinuity of stressing.

Its life, and therefore that of the entire unit, is thus lengthened.

Furthermore, the spacer of elastic material according to the invention makes it possible to allow for any eccentricity between the diaphragm and the movable plate, without this resulting in any wear between them, thus further lengthening the life of the unit.

In addition, the spacer of elastic material according to the invention may advantageously constitute by itself the sole engagement means to be provided between the movable plate and the diaphragm for the purpose of fastening the movable plate to the diaphragm.

Consequently, since mechanical contact no longer exists between the diaphragm and the movable plate, internal friction, which otherwise unavoidably exists, is thereby advantageously reduced in a manner favourable to good regularity of the response curve of the variator, and more precisely to a reduction of the hysteresis of this response curve entailing, as is well known, for the same speed value a differentiation between the transmission ratio obtained for an increasing speed and the transmission ratio obtained for a decreasing speed.

Because of the reduction of hysteresis achieved, the efficiency of the unit is improved.

Moreover, because of its very presence the spacer of elastic material according to the invention prevents the penetration, between the diaphragm and the movable plate against which it bears, of any dust, stones or the like which could disturb the operation of the unit.

In addition, in the case of a driving pulley, it prevents by itself any possibility of the diaphragm being turned inside out in the retracted position of the movable plate, without there being any need to provide other specific means for the purpose.

By itself it also ensures the filtration of the vibrations to which the pulley in question is subjected, and therefore advantageously brings about a reduction of the noise which the pulley may cause.

Finally, it leads to a reduction of the axial dimensions of the unit, because of the impossibility of the diaphragm becoming detached from the movable plate in the retracted position of the latter, and, at least in certain embodiments, it may also advantageously lead to a reduction of the diameter of the unit.

BRIEF DESCRIPTION OF THE DRAWINGS

FIG. 1 is a view in axial section of a speed variator comprising a pulley in accordance with the invention, for a maximum transmission ratio;

FIG. 2 repeats on a larger scale the detail of FIG. 1 enclosed in the box II in that Figure;

FIG. 3 repeats part of FIG. 1, for a minimum transmission ratio;

FIGS. 4 to 11 are similar views to FIG. 4, each relating to a respective embodiment;

DETAILED DESCRIPTION OF THE PREFERRED EMBODIMENTS

Figure 8:
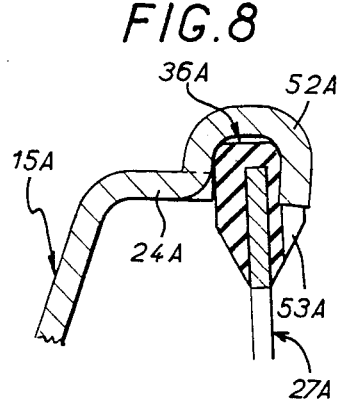

As illustrated in these drawings, the speed variator to which the invention is applied comprises in the usual manner a driving pulley 10A, a driven pulley 10B, and a belt passing in an endless loop over these pulleys.

Likewise in a manner known per se, driving pulley 10A comprises a hub 12A which for example, and as illustrated, is rotationally fixed by a key 13A on a drive shaft 14A and, disposed facing one another and around the hub 12A, two annular plates 15A, 16A, of which at least one—the plate 15A in the embodiment illustrated, here referred to for the sake of convenience as the movable plate—is mounted for axial movement relative to the hub 12A.

In the embodiment shown, the movable plate 15A is for this purpose provided in its central zone with an axial collar 17A, by which it is attached to a sleeve 18A and, by means of the latter, is engaged with clearance on the hub 12A. The other plate, the plate 16A—here for the sake of convenience called the fixed plate—is fastened axially and rotationally, that is to say circumferentially, to the hub 12A, and for that purpose is attached by an axial collar 20A to a bearing surface 21A of the hub 12A.

Facing one another, the plates 15A, 16A have frusto-conical sides 22A, 23A, whose slopes are opposite to one another, and at the same time the belt 11 has a trapezoidal section.

Finally, the plates 15A, 16A have axial flanges 24A, 25A directed oppositely to one another, on their periphery.

In a manner known per se, the movable plate 15A is under the control of resilient return means which urge it permanently in the direction of the fixed plate 16A, and these resilient return means consist of an annular member 27A, called the diaphragm, comprising on the one hand a peripheral portion 28A forming a dished plate spring, which axially bears rockingly against the movable plate 15A in the manner to be described in detail below, and on the other hand a central portion divided into radical fingers 29A by slots 30A and axially bearing rockingly against a member 32A fastened axially and rotationally, that is to say circumferentially, to the hub 12A, this member being called the support member.

In the embodiment shown, the support member 32A is attached by crimping to the hub 12A and, for the purpose of rotationally driving the diaphragm 27A, it carries from place to place axially projecting pins 33A, each individually engaged in a slot 30A in the diaphragm 27A.

Finally, in the embodiment shown, the diaphragm 27A carries by its radial fingers 29A, from place ato place, weights 35A which, in the case of a driving pulley, project from that face of the diaphragm 27A which is turned towards the movable plate 15A, between the diaphragm 27A and the plate 15A.

These arrangements are well known in themselves, particularly from U.S. Pat. No. 4,132,120 previously mentioned, and, since they do not form part of the invention, they will not be described in greater detail here.

The driven pulley 10B has in general a similar construction to that of the driving pulley 10A comprising the hub 12B fastened by a key 13B on a shaft 14B, the movable plate 15B acted on by a diaphragm 27B bearing against a support member 32B fastened to the hub 12B, and a fixed plate 16B.

However, in the case of a driven pulley, the weights 35B carried by the diaphragm 27B project from that face of the latter which is on the opposite side to the movable plate 15B.

According to the invention, between the diaphragm 27A of the driving pulley 10A and the movable plate 15A of the latter there is axially interposed, in order to form a rocking axial support, a spacer 36A of elastic material, which on the one hand is fastened to the peripheral portion of the diaphragm 27A forming a dished plate spring, both axially and circumferentially, and which on the other hand is fastened, at least axially, to the movable plate 15A.

In the embodiment shown in FIGS. 1 to 3, the spacer 36A of elastic material is fastened, both axially and circumferentially, to the movable plate 15A by means of an auxiliary member 38A, here for the sake of convenience called a connecting member, to which it is in turn fastened both axially and circumferentially.

In practice, in this embodiment this auxiliary member 38A has axially the section of an angle bar; it comprises in fact, transversely, a plate 39A to which the spacer 36A of elastic material is fastened, and, axially, a crown 40A by which it is fastened, for example by spot welding, as shown, to the axial flange 24A of the movable plate 15A.

In the embodiment shown in FIGS. 1 to 3, the spacer 36A of elastic material extends essentially only over that face of the diaphragm 27A which faces the movable plate 15A, while nevertheless also extending over the edge face 42A of the diaphragm 27A.

Similarly, it extends essentially only over that face of the plate 39A of the connecting member 38A which faces the diaphragm 27A, while nevertheless extending also over the edge face 43A of the plate 39A.

In addition, in the embodiment shown in FIGS. 1 to 3 the spacer is a solid member extending in one piece from the diaphragm 27A to the connecting member 38A.

Finally, in this embodiment the spacer 36A of elastic material is joined by adhesion both to the diaphragm 27A and the connecting member 38A.

In other words, it is made by vulcanisation in situ of a suitable rubbery mass between the peripheral portion of the diaphragm 27A, which forms the dished plate spring, and the plate 39A of the connecting member 38A, at a temperature which does not otherwise affect the metalurgical properties of the diaphragm 27A.

After construction in this manner the assembly formed by the diaphragm 27A, the spacer 36A of elastic material, and the connecting member 38A constitutes an integral member, thus facilitating its handling and its fitting in the driving pulley 10A.

As will be understood, since engagement means are required for rotationally fastening the movable plate 15A on the diaphragm 27A and, by means of the latter and of the support member 32A, on the hub 12A, the spacer 36A of elastic material according to the invention can advantageously itself constitute the sole such engagement means because of its fastening to the diaphragm 27A and to the connecting member 38A, and because of the fastening of the latter to the movable plate 15A.

In other words, no other engagement means is provided between the diaphragm 27A and the movable plate 15A.

Thus, in this embodiment the spacer 36A of the elastic material according to the invention conjointly effects on the one hand the rocking axial support of the diaphragm 27A on the movable plate 15A, and on the other hand the rotational driving of the movable plate 15A.

In the embodiment shown these arrangements are not repeated in the driven pulley 10B, in which, in conventional manner, on the one hand the diaphragm 27B rockingly bears axially, by its peripheral portion 28B forming a dished plate spring, directly against the axial flange 25B of the movable plate 15B, and on the other hand, for the rotational driving of the movable plate 15B by the diaphragm 27B, the said peripheral portion of the latter which forms a dished plate spring 28B carries, from place to place, engagement blocks 42B each of which is engaged in a respective cutout 43 provided for the purpose in the said axial flange 25B of the movable plate 15B, in accordance with arrangements described in detail in the U.S. Pat. No. 4,132,120 previously mentioned.

In the state of rest, conditions are such that the movable plate 15A of the driving pulley 10A occupies an advanced position near the associated fixed plate 16A, so that the belt 11 automatically assumes a state of rest configuration in which it extends in the peripheral zone of the driving pulley 10 and in the central zone of the driven pulley 10B, and that accordingly the movable plate 15B of the driven pulley 10B in turn assumes a retracted position relative to the associated fixed plate 16B.

During operation the transmission ratio is therefore at first maximum.

Beyond a certain speed the movable plate 15A of the driving pulley 10A then passes, through the action of centrifugal force, into a retracted position relative to the associated fixed plate 16A, so that the belt 11 then automatically assumes a configuration in which it extends in the central zone of the driving pulley 10A and in the peripheral zone of the driven pulley 10B, and the movable plate 15B of the driven pulley 10B in turn assumes an advanced position relative to the fixed plate 16B associated with it (FIG. 3).

The transmission ratio is then minimum.

As will be observed, and as diagrammatically indicated in broken lines in FIG. 2, between the advanced position of the movable plate 15A of the driving pulley 10A (FIG. 1) and the retracted position of that movable plate (FIG. 3) the diaphragm 27A rocks from a frustoconical configuration in one direction to a frustoconical configuration in the opposite direction.

The spacer 36A of elastic material in accordance with the invention permits this rocking while effecting the axial support of the diaphragm 27A against the movable plate 15A.

In an alternative embodiment (not shown) the rotational driving of the movable plate 15A is effected independently of the diaphragm 27A and of the spacer 36A of elastic material, a splined arrangement being for example provided for this purpose between it and the hub 12A; in this case the connecting member 38A may be connected only axially to the movable plate 15A, and not also circumferentially, and this is also true of the spacer 36A of elastic material in this case.

In the modified embodiments illustrated in FIGS. 4 and 5 the spacer 36A of elastic material also extends over a portion of the face of the diaphragm 27A on the opposite side to that facing the movable plate 15A, forming on that face a radial return 45A of limited radial extend.

For at least some applications the conditions for the in situ formation on the diaphragm 27A of the spacer 36A of elastic material may thereby be improved.

In addition, in the embodiment shown in FIGS. 4 to 6, the spacer 36A of elastic material forms axially a crown 47A by which it is engaged on the axial flange 24A of the movable plate 15A and by which it is directly fastened axially thereto, without the intervention of any auxiliary member.

In the embodiment shown in FIG. 4 it is adhesive bonded by means of this crown 47A on the said flange 24A of the movable plate 15A, and it is thus axially and rotationally fastened thereto.

As an alternative (FIG. 5) securing means are provided, such as a collar or hoop 48A, which grip around the crown 47A of the spacer 36A of elastic material, without any other fastening means being specifically provided between this crown 74A and the axial flange 24A of the movable plate 15A.

For preference, and as illustrated, the movable plate 15A then has on its axial flange 24A, at the end of the latter, a retaining bead 49A, in relation to which the aforesaid securing means are axially offset and on which the spacer 36A of elastic material is then anchored, so that it is then fastened by adhesion, both axially and rotationally, to the movable plate 15A.

In the embodiment shown in FIG. 6, the spacer 36A of elastic material is adhesive bonded to the axial flange 24A of the movable plate 15A.

Figure 9:
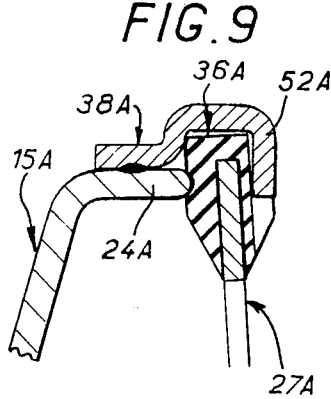

In addition, in this embodiment, as well as in the embodiments shown in FIGS. 7 to 9, it extends substantially equally over the two faces of the diaphragms 27A and thus forms a groove in which the diaphragm 27A is mounted by the edge of its peripheral portion forming a dished plate spring 28A.

As previously, the spacer 36A of elastic material may be joined by adhesion to the diaphragm 27A, by being formed thereon in situ.

As an alternative, it may be adhesive bonded to the diaphragm 27A.

In this case it may be a member produced directly with the annular configuration of the diaphragm 27A, or a sectional member for wrapping around the latter.

In all cases, and as in the previous embodiments, the spacer 36A of elastic material is fastened both axially and circumferentially to the diaphragm 27A.

In the embodiments shown in FIGS. 7 and 8 the movable plate 15A is provided from place to place with lugs 52A which are integral with its axial flange 24A, and by which it engages over the assembly formed by the diaphragm 27A and the spacer 36A of elastic material, these lugs 52A extending radially around the said assembly on its periphery.

In the embodiment shown in FIG. 7 these lugs 52A ensure relatively powerful axial gripping of this assembly, being anchored by their end in the spacer 36A of elastic material.

· As an alternative (FIG. 8), they are in engagement with the said assembly with the aid of a tenon and mortise arrangement, the spacer 36A of elastic material being provided from place to place with radial grooves 53A in which the lugs 52A are engaged after the style of tenons, optionally with slight axial gripping of the spacer 36A of elastic material in the bottom of the mortises 53A.

A similar arrangement is adopted in the modified embodiment shown in FIG. 9, in which the lugs 52A are no longer integral with the movable plate 15A, but are integral with a connecting member 38A attached to the axial flange 24A of the movable plate 15A.

Figure 10:
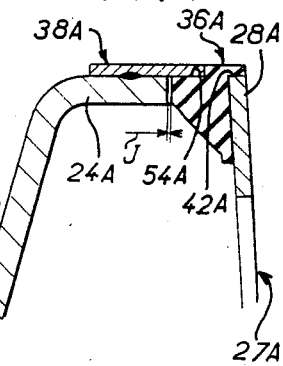

In the embodiment illustrated in FIG. 10 a connecting member 38A is also used between the movable plate 15A and the spacer 36A of elastic material, but this connecting member is reduced to a simple crown, formed for example of a simple strip suitably wound into the shape of a crown or of a simple length of tubing.

In the embodiment shown the spacer 36A of elastic material is joined by adhesion both to the diaphragm 27A and to the connecting member 38A, and for the purpose of cooperation with the latter it is provided annularly with a cylindrical bearing surface 54A.

For preference, and as shown, an axial clearance J is left between the edge of the axial flange 24A of the movable plate 15A and the spacer 36A of elastic material, and the latter also extends over the edge 42A of the diaphragm 27A.

Figure 11:
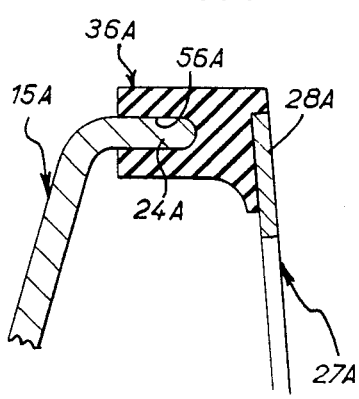

In the embodiment shown in FIG. 11 the spacer 36A of elastic material forms axially a groove 56A by which it is engaged over the axial flange 24A of the movable plate 15A, being for example adhesive bonded thereto.

In this case, and as in the embodiments shown in FIGS. 4 to 8, it is directly fastened axially and rotationally, that is to say circumferentially, to the movable plate 15A, without the intervention of any auxiliary part.

Arrangements of the type described above can of course be adopted for the driven pulley 10B, in replacement of the engagement blocks 42 previously described for this pulley.

FIGS. 12 to 27 illustrate by way of example one such possibility.

In these figures the spacer 36B of elastic material used is joined by adhesion to the portion of the diaphragm 27B which forms a dished plate spring 28B, extending essentially only over that face of the diaphragm 27B which is turned towards the associated movable plate 15B, while nevertheless also extending over the edge face of the diaphragm.

It is however obvious that, as an alternative, embodiments of the type previously described for the driving pulley 10A can also be adopted.

In the embodiments illustrated in FIGS. 12 to 19 a connecting member 38B is provided between the spacer 36B of elastic material and the movable plate 15B.

Figure 12:
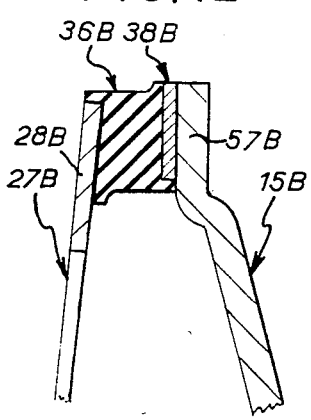
FIG. 12 is a similar view to that in FIG. 2, and relates to a form of construction of the other pulley in the speed variator shown in FIG. 1.

In the embodiments shown in FIG. 12, this connecting member 38B is a simple washer adhesive bonded to the movable plate 15B and for this purpose provided on its periphery with a radial flange 57B.

Figure 13:
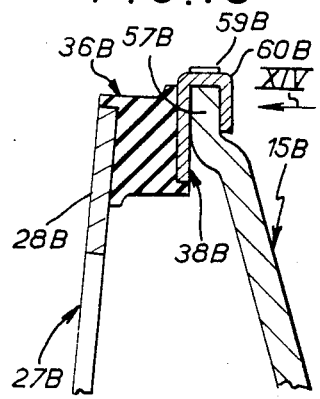
FIG. 13 is a similar view to that shown in FIG. 12, relating to a modified embodiment.
Figure 14:
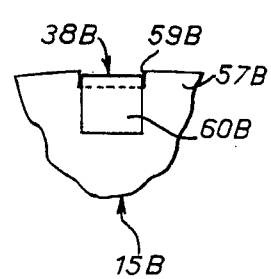
FIG. 14 is a partial view in elevation of this modified embodiment, in the direction of the arrow XIV in FIG. 13.

In the modified embodiment shown in FIGS. 13 and 14 the connecting member 38B is attached to the movable plate 15B and for that purpose is provided, from place to place, with lugs 60B by which, after passing through cutouts 59B in the radial flange 57B of this movable plate 15B, it is hooked on the latter; in this case it is thus fastened both axially and circumferentially to the movable plate 15B.

As an alternative (FIG. 15) it is welded, for example spot welded, to the radial flange 57B of the movable plate 15B.

In this case it may, as illustrated, be reduced to a simple washer.

Figure 16:
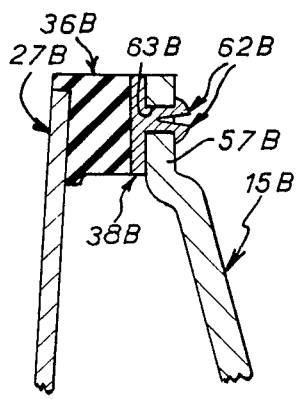
Figure 17:
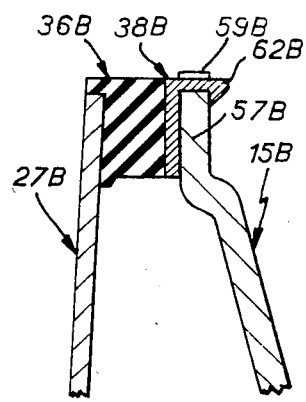
Figure 18:
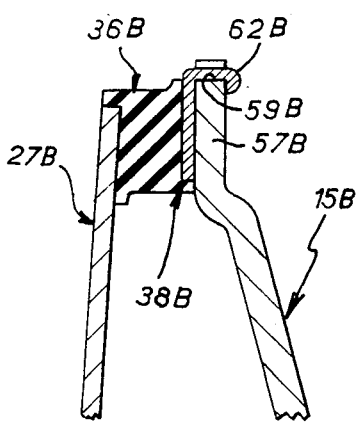

In the alternative embodiments illustrated in FIGS. 16 to 18, the connecting member 38B carries, from place to place, axially projecting claws 62B by which it is clipped onto the movable plate 15B, thus being fastened both axially and circumferentially to the latter.

For example (FIG. 16), these claws 62B are positioned in the central zone of the annular washer constituting the connecting member 38B and are arranged back to back in parts, so that they pass through openings 63B provided in the radial flange 57B of the movable plate 15B, at a distance from the periphery of the latter.

As an alternative (FIG. 17), the claws 62B are disposed singly on the periphery of the connecting member 38B, and each is individually engaged in slots 59B in the radial flange 57B of the movable plate 15B.

Arrangements of this kind are particularly suitable for the production of the connecting member 38B in synthetic or so-called plastics material.

However, when the claws 62B are provided on the periphery of the connecting member 38B, they are equally suitable for the production of this connecting member 38B in metal (FIG. 18).

Figure 19:
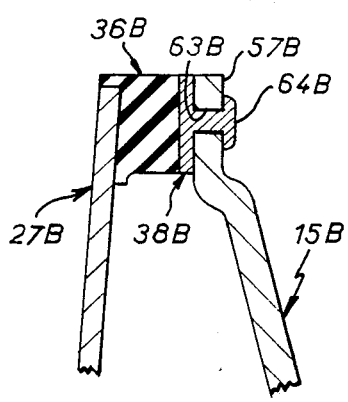

In the modified embodiment illustrated in FIG. 19, the connecting member 38B is likewise attached to the movable plate 15B, and for this purpose is provided, from place to place, with axially projecting studs 64B by which it is riveted to the radial flange 57B of the movable plate 15B, these studs passing for this purpose through passages 63B in the said radical flange 57B before being hammered over on the other side of the latter.

An arrangement of this kind is preferably suitable for the construction of the connecting member 38B in synthetic, so-called plastics, material.

In an alternative embodiment (not shown) the connecting member 38B is riveted to the movable plate 15B, the heads of the rivets used being then sunk in the mass of the spacer 36B of the elastic material.

Figure 20:
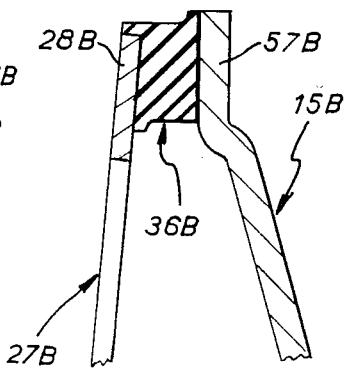
FIGS. 15 to 20 are other views similar to that shown in FIG. 12 and relates to each case to other respective modified embodiments.
Figure 15:
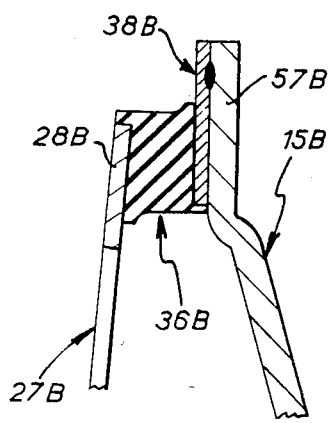

In the modified embodiment shown in FIG. 20, the spacer 36B of elastic material is directly fastened to the movable plate 15B, or more precisely to the radial flange 57B provided on the periphery of the latter.

For example, the spacer 36B of elastic material may be joined by adhesion to the movable plate 15B, and similarly joined to the diaphragms 27B.

Figure 21:
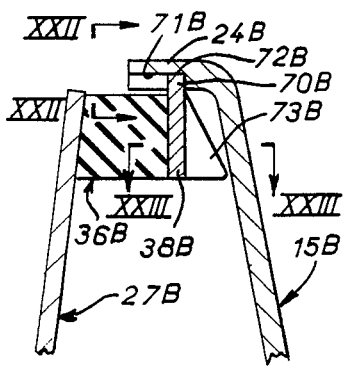
FIG. 21 is likewise a similar view to that shown in FIG. 12 and relates to another modified embodiment.
Figure 22:
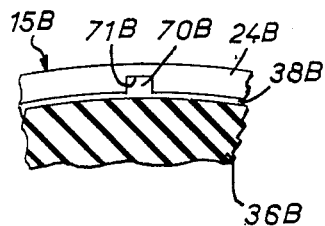
FIGS. 22 and 23 are partial views in section of this modified embodiment, taken respectively on the lines XXII—XXII and XXIII—XXIII in FIG. 21.
Figure 23:
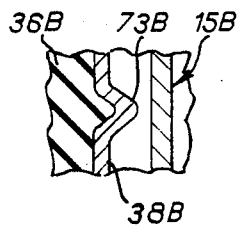

In the modified embodiment illustrated in FIGS. 21 to 23, a connecting member 38B is used and, while the movable plate 15B is provided with an axial flange 24B on its outer periphery, this connecting member 38B, which is generally annular, is itself provided, radially, from place to place on its outer periphery, with radially projecting tenons 70B, suitably distributed circularly, by which it is in engagement with slots 71B provided for the purpose of complementary manner on the inner face of the axial flange 24B of the movable plate 15B.

The slots 71B, which are formed in the actual thickness of this axial flange 24B, may be made therein in advance; as an alternative, they may be made during the actual penetration of the tenons 70B on the annular member 38B into this axial flange 24B.

However this may be, the tenons 70B in practice bear axially against a transverse shoulder 72B bounding the slots 71B at their end.

In addition, the connecting member 38B is provided, from place to place, with teeth 73B which project axially in the direction of the said movable plate 15B and which are suitably distributed circularly, for the purpose of limiting the rocking thereof when the diaphragm 27B is acted on, these teeth 73B then coming to bear against the said movable plate 15B.

For example, and as illustrated, each of these teeth 73B is formed by a deformation in quarter-olive shape which is open towards the axis of the assembly and the inner periphery of the connecting member 38B, and which may be for example be formed by the simple pressing of the latter.

In any case, taking these teeth 73B into account and also bearing in mind the fact that in practice the tenons 70B are engaged by force in the corresponding slots 71B, and finally also taking into account the fact that in the case of a driven pulley the diaphragm 27B permanently urges the spacer 36B of elastic material in the direction of the movable plate 15B, everything occurs as if, as previously and also as desired, the spacer 36B of elastic material were connected axially to the movable plate 15B.

An embodiment of this kind, which has the advantage of being of small axial dimensions and of being easy to produce, may also be convenient for a driven pulley, as more particularly described above, equally as well as for a driving pulley, like all the previously described embodiments.

In cases where it is applied to a driving pulley, provision is preverably made for the deformation of the axial flange of the movable plate in such a manner as to ensure suitable axial retention relative to the latter.

If necessary for the desired axial connection, an arrangement of this kind may also be applied in the case of a driven pulley.

Figure 24:
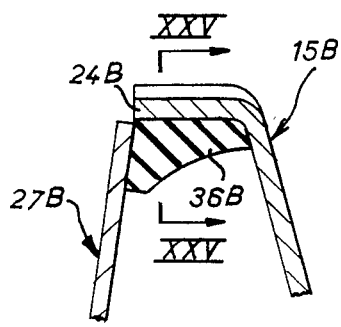
FIG. 24 is once again a similar view to that shown in FIG. 12 and relates to another modified embodiment.
Figure 25:
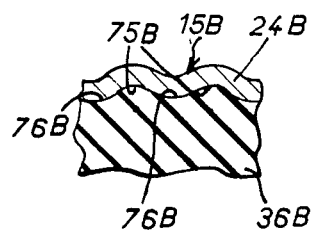
FIG. 25 is a view in cross-section of this modified embodiment, taken on the line XXV—XXV in FIG. 24.

In the embodiment illustrated in FIGS. 24 and 25, no connecting member is used and, since the movable plate 15B is provided with an axial flange 24B on its outer periphery, complementary corrugations 75B and 76B respectively are provided on the circumferences of the axial flange 24B and on the spacer 36B of elastic material, by means of which corrugations the spacer 36B of elastic material is held in engagement with the axial flange 24B in order to fasten the diaphragm 27B rotationally to the movable plate 15B.

For the necessary axial connection the spacer 36B of elastic material is in practice engaged by force in the axial flange 24B of the movable plate 15B.

If desired, particularly in cases where an arrangement of this kind is applied to the driving pulley, the spacer 36B of elastic material, which as previously is joined by adhesion to the diaphragm 27B, may in addition be adhesive bonded to the axial flange 24B of the movable plate 15B at the site of the corrugations 75B and 76B.

Figure 26:
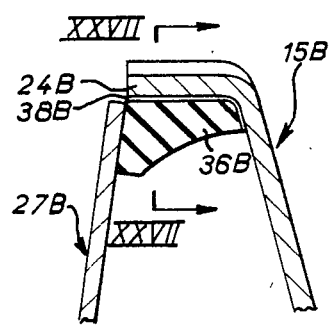
FIGS. 26 and 27 are views respectively similar to those shown in FIGS. 24 and 25, and relate to another modified embodiment.
Figure 27:
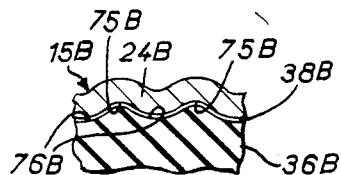

In the modified embodiment illustrated in FIGS. 26 and 27, the corrugations of the spacer 36B of elastic material are covered on the surface by an iron strip 38B, to which the spacer is joined by adhesion and which forms a connecting member.

As previously, adhesive bonding may or may not be provided between this strip and the axial flange 24B of the movable plate 15B, while in any case engagement by force in the latter is provided in order to obtain the desired axial connection.

However this may be, this strip is advantageously favourable to better transmission of torque between the spacer 36B of elastic material and the movable plate 15B, and is also favourable to better location of the zone of this spacer 36B of elastic material forming a hinge, during the rocking of the diaphragm 27B as the result of action on the latter.

In the foregoing it has been assumed that the rocking axial support between the diaphragm 27A of the driving pulley 10A and the corresponding support member 32A was effected directly, metal on metal.

As an alternative (FIG. 28), and in combination with the previously described arrangements, a spacer 66A of elastic material is interposed axially between the diaphragm 27A and the support member 32A, being for example joined by adhesion or adhesive bonding to the diaphragm 27A and to the support member 32A.

It will be noted that the accidental turning inside out of the diaphragm 27A is avoided and that the spacers 36A and 66A of elastic material work substantially in tension and in compression.

Figure 28:
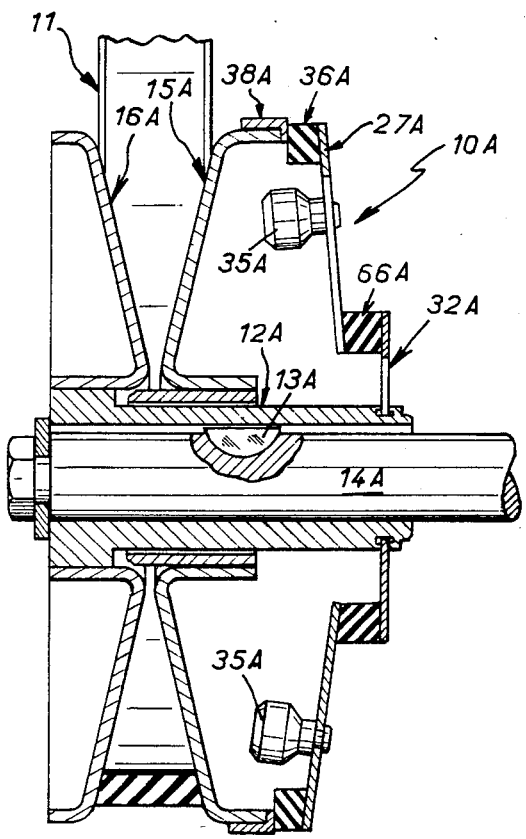
FIG. 28 repeats part of FIG. 1 and relates to another modified embodiment.

In FIG. 28 the spacer 36A of elastic material is, as previously, on the inner side of the diaphragm 27A, that is to say on the side facing the movable plate 15A, while the spacer 66A of elastic material is on the opposite side of the diaphragm 27A.

Figure 29:
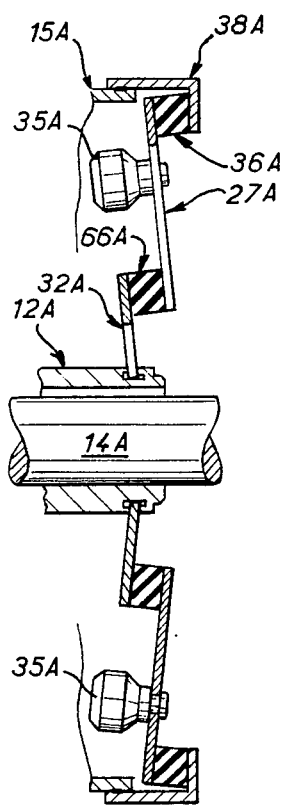
FIGS. 29 to 31 repeat of FIG. 21, each relating respectively to other modified embodiments.

As an alternative (FIG. 29), the inverse arrangement may be adopted, the spacer 36A of elastic material being on the outer side of the diaphragm 27A and the spacer 66A of elastic material being on the opposite side.

Figure 30:
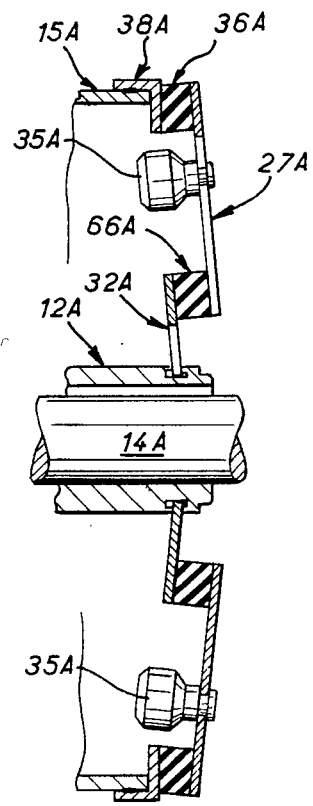
Figure 31:
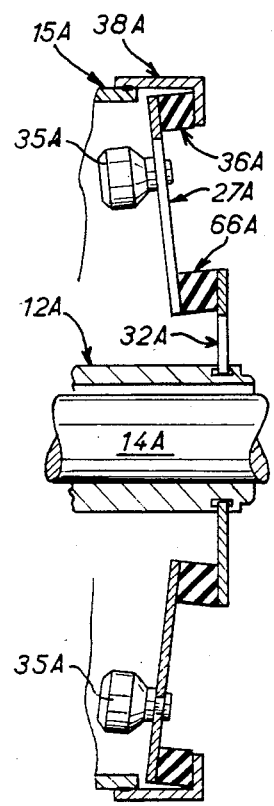

The spacers 36A and 66A of elastic material may equally well be disposed on the same side of the diaphragm 27A, either on the inner side (FIG. 30) or on the outer side (FIG. 31).

These arrangements may make it possible to save space, depending on particular installation requirements.

The present invention is of course not limited to the embodiments described and illustrated, but includes all alternative constructions and/or combinations of their various elements.

In particular, the spacer of elastic material used in accordance with the invention is not necessarily a solid piece.

It could on the contrary be divided circularly into separate blocks or, if it is circularly continuous, it could have cutouts in contact with one or the other member which it connects, or else have a cellular structure.

I claim:

1. A speed variator pulley comprising a hub, two annular plates disposed facing one another and around the hub, at least one of said plates, referred to as the movable plate, being mounted for axial movement relative to the hub under the control of resilient return means comprising an annular diaphragm, said diaphragm comprising on the one hand a peripheral portion forming a dished plate spring, which axially bears so as to rock against the movable plate, and on the other hand a central portion divided by slots into radial fingers and axially bearing so as to rock against a support member fastened axially to the hub, wherein between the diaphragm and the movable plate there is axially interposed a spacer of elastic material forming a rocking axial support, which spacer is fastened both axially and circumferentially to the peripheral portion of the diaphragm and at least axially to the movable plate.

2. A speed variator pulley according to claim 1, wherein said spacer of elastic material extends essentially only over that face of the diaphragm which is turned towards the movable plate.

3. A speed variator pulley according to claim 2, wherein said spacer of elastic material extends also over an edge face of the diaphragm.

4. A speed variator pulley according to claim 3, wherein said spacer of elastic material extends also over a portion of the face of the diaphragm opposite to that facing the movable plate.

5. A speed variator pulley according to claim 1, wherein said spacer of elastic material forms a groove into which the diaphragm is inserted by its peripheral edge, and said spacer extends substantially equally over both faces of the diaphragm.

6. A speed variator pulley according to claim 1, wherein said spacer of elastic material is joined by adhesion or adhesive bonding to the diaphragm.

7. A speed variator pulley according to claim 1, wherein engagement means are provided for rotationally fastening the movable plate on the diaphragm, and said spacer of elastic material itself constitutes the sole such engagement means.

8. A speed variator pulley according to claim 1, wherein said spacer of elastic material is axially fastened to the movable plate by means of an auxiliary member, referred to as the connecting member, and to which it is in turn fastened both axially and circumferentially.

9. A speed variator pulley according to claim 8, wherein said spacer of elastic material is joined by adhesion or adhesive bonding to the connecting member.

10. A speed variator pulley according to claim 8, wherein said spacer of elastic material is rotationally fastened to the connecting member by an arrangement comprising at least a tenon and mortise.

11. A speed variator pulley according to claim 8 wherein said connecting member is attached to the movable plate.

12. A speed variator pulley according to claim 8, wherein on its outer periphery the connecting member is provided with radially projecting tenons by which it is in engagement with slots provided on the inner face of an axial flange on the movable plate.

13. A speed variator pulley according to claim 12, wherein said connecting member is provided with teeth projecting towards the movable plate and adapted to limit the rocking movement thereof.

14. A speed variator pulley according to claim 8, wherein said spacer of elastically deformable material is provided circumferentially with corrugations by which it is in engagement with complementary corrugations provided on an axial flange of the movable plate.

15. A speed variator pulley according to claim 14, wherein said corrugations are covered on their surface by an iron strip.

16. A speed variator pulley according to claim 1, wherein said spacer of elastic material is axially fastened directly to the movable plate.

17. A speed variator pulley according to claim 16, wherein said spacer of elastic material is provided with a crown by which it is engaged on an axial flange of the movable plate.

18. A speed variator pulley according to claim 17, wherein said movable plate is provided with an annular retaining bead projecting from its axial flange.

19. A speed variator pulley according to claim 18, wherein said spacer of elastic material is provided with a groove by which it is engaged on the movable plate.

20. A speed variator pulley according to claim 16, wherein said spacer of elastic material is joined by adhesion or adhesive bonding to the movable plate.

21. A speed variator pulley according to claim 16, wherein said movable plate is provided with integral lugs by which it is engaged on the assembly formed by the diaphragm and the spacer of elastic material.

22. A speed variator pulley according to claim 1, wherein in combination, there is axially interposed between the diaphragm and the support member another spacer of elastic material joined by adhesion or adhesive bonding to the said diaphragm and to the said support member.

23. A speed variator pulley according to claim 1, wherein said spacer comprises a single circularly continuous member.

* * * * *